N. V. FEDOTOFF.
HIGH TENSION RECTIFYING APPARATUS.
APPLICATION FILED MAR. 22, 1918.

1,382,965.

Patented June 28, 1921.

WITNESS
Frank H. Allen

INVENTOR
Nicholas V. Fedotoff

UNITED STATES PATENT OFFICE.

NICHOLAS V. FEDOTOFF, OF BROOKLYN, NEW YORK.

HIGH-TENSION-RECTIFYING APPARATUS.

1,382,965.

Specification of Letters Patent. Patented June 28, 1921.

Application filed March 22, 1918. Serial No. 223,975.

*To all whom it may concern:*

Be it known that I, NICHOLAS V. FEDOTOFF, a Russian subject, residing in the borough of Brooklyn, county of Kings, and State of New York, have invented a new and useful High-Tension-Rectifying Apparatus, of which the following is a specification.

The invention has for an object to provide an apparatus for rectifying polyphase alternating current, whereby unidirectional current will be obtained which is substantially constant, or non-fluctuating, even though the apparatus be subjected to high potentials.

Another object of the invention is to construct the rectifying apparatus in such manner as to avoid as far as possible the occurrence of undue arcing at high potentials, particularly by means of the character of the switching devices and contact members employed, and their disposition relative to each other.

Another object of the invention is to provide a rectifying apparatus wherein the moving or rotating parts will be as simple and strong as possible, and having fixed contacts so arranged that the connections between the several phases may be readily made, as well as the circuit changes between contacts of the same phase, to the end that the apparatus will not be unduly complicated, and will stand long continued use at high potentials without undue injury or deterioration.

Further objects and advantages of the invention will be in part obvious and in part specifically pointed out in the description hereinafter contained which, taken in connection with the accompanying drawings, discloses a preferred embodiment of the invention: such embodiment, however, is to be considered merely as illustrative of its principle. In the drawings.

Figure 1:
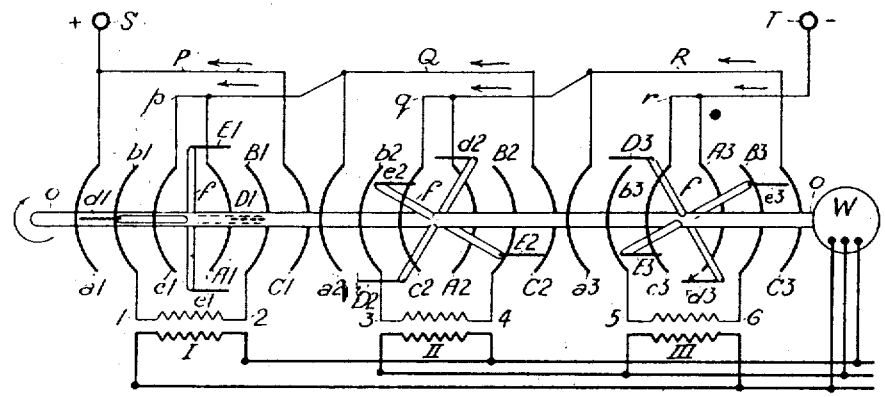
Figure 1 is a somewhat diagrammatic view of an apparatus made in accordance with the invention, and applied to a three-phase circuit.

The invention is disclosed as applied to a three-phase circuit having primary coils I, II, III, together with coöperating secondary windings having terminals 1, 2; 3, 4; and 5, 6 respectively.

In accordance with the present invention, the rectifying apparatus comprises a switching device which maintains the secondary polyphase windings at all times in series with one another, but reverses the connection of each winding at the time when the direction of alternating current therein changes, with the result that the derived current, made up of the components derived from the several phases, is unidirectional. When the apparatus is used at high potentials, if undue arcing should occur in the switching device when the connections to the several phases are being reversed, or if a substantial fraction of a wave in any phase should be cut out of circuit in order to avoid arcing, the unidirectional current derived from the windings would fluctuate unduly, particularly at the times when the direction of current is changing in the windings.

Furthermore, undue arcing tends to cause rapid deterioration of the insulation employed in connection with the switching device, and to burn into the metallic contact members so as to shorten the life of the apparatus.

It is accordingly the purpose of the present invention to construct the switching device in such manner that the occurrence of arcing at high potentials will be avoided as much as possible, and to provide a structure wherein the difficulty of insulating the conducting parts will be minimized.

Referring to the drawings, I provide a plurality of fixed contact members $b^1$, $B^1$; $b^2$, $B^2$; and $b^3$, $B^3$ respectively connected to the terminals 1, 2; 3, 4; and 5, 6 of the secondary windings in the several phases, such contacts being preferably arcuate in shape and arranged concentrically about a rotary shaft O, which is later more fully described. There is associated with each of the above-mentioned fixed contact members, a set of contacts which will be referred to as of positive sign or negative sign, according to the direction of current therein; that is to say, in connection with the contact member $b^1$ there is provided a set of fixed contacts comprising the contact $a^1$ of positive sign and contact $c^1$ of negative sign, while with the contact member $B^1$ there is associated a set of fixed contacts comprising the contact $C^1$ of positive sign and the contact $A^1$ of negative sign; and similarly the contacts $b^2$, $B^2$; $b^3$ and $B^3$ are each associated with sets of contacts comprising respectively the contacts $a^2$, $C^2$, $a^3$, $C^3$ of positive sign, and contacts $c^2$, $A^2$, $c^3$, $A^3$ of negative sign. Thus, by selectively connecting contact members in circuit with the contacts, in any given phase, for example, members $b^1$ and $B^1$ with the contacts of positive and negative sign in the sets of contacts respectively associated therewith, the direction of current in the circuit in which the contacts are connected, may be maintained constant notwithstanding reversals in the direction of the current in the several windings.

In the embodiment illustrated, the above-mentioned changes in circuit are brought about by means of a plurality of metallic bridging members $d^1$, $D^1$; $d^2$, $D^2$; $d^3$, $D^3$; which are adapted to make and break circuit between the contact members $a^1$, $b^1$, $A^1$, $B^1$; $a^2$, $b^2$, $A^2$, $B^2$; $a^3$, $b^3$, $A^3$, $B^3$; and a plurality of similar bridging members $e^1$, $E^1$; $e^2$, $E^2$; $e^3$, $E^3$ adapted to make and break circuit respectively between the contact members $b^1$, $c^1$, $B^1$, $C^1$; $b^2$, $c^2$, $B^2$, $C^2$; $b^3$, $c^3$, $B^3$, $C^3$. The bridging members above described are preferably supported by means of a plurality of radial insulating rods $f$ secured to the shaft O, the latter being rotated in timed relation to the frequency of the polyphase circuit, for example, by a synchronous motor W. Thus the structure of the rotating parts of the switching device is exceedingly simple, since it is not necessary to provide any circuit connections between the bridging member associated with the same phase, nor between those in the different phases.

Each bridging member is entirely isolated electrically, and the shaft O may therefore be made of metal without danger of short-circuiting, whereby the rotating parts will be simpler, stronger, and less liable to vibrations than if insulation had to be employed for the shaft or high tension connections provided between different points along or about the same.

Furthermore, it will be noted that as one set of bridging members, for example, the members $d^1$, $D^1$ break circuit respectively between contact member $b^1$, contact $a^1$; and contact member $B^1$, and contact $A^1$, circuit is being made between contact member $b^1$ and contact $c^1$; and between contact member $B^1$ and contact $C^1$ respectively by bridging members $e^1$ and $E^1$. However, the tendency toward arcing is much cut down owing to the fact that several breaks are provided in series at the time when bridging members $d^1$ and $D^1$ separate from their associated fixed contacts, and also due to the fact that such bridging members do not move to a position adjacent other parts at different potentials after they break circuit. Furthermore, the bridging members $d^1$, $D^1$, and $e^1$ and $E^1$ are spaced apart to such an extent that their operations do not interfere, that is to say when bridging members $d^1$, $D^1$ break circuit, there is no tendency toward arcing in the operation of making circuit through the bridging member $e^1$, $E^1$.

All of the phases are maintained in series connection by interconnecting the sets of contacts $a^1$, $c^1$, etc. previously described to the contacts of opposite sign in the next phase; positive contacts $a^3$, $C^3$ being connected to the contacts of negative sign in an adjacent phase such as contacts $c^2$, $A^2$ by means of conductors R and $q$, while the contacts $a^2$ and $C^2$ of phase II, which are of positive sign, are connected to contacts $c^1$, $A^1$ in phase I, which are of negative sign, through conductors $q$ and $p$. In the present instance contacts $a^1$ and $C^1$ of positive sign in phase I are connected to the rectified current terminal S, while the contacts $c^3$ and $A^3$ of negative sign in phase III are connected to the negative rectified current terminal T.

In Fig. 1, the direction of current in the several phases is indicated by small vectors $k$, $l$, and $m$: thus tracing circuit from the negative rectified current terminal T to the positive terminal S, current will flow from terminal T to contact $c^3$, bridging member $E^3$, contact member $b^3$, terminals 5 and 6, contact member $B^3$, bridging member $e^3$, contact $C^3$, conductor R, conductor $q$, contact $c^2$, bridging member $e^2$, contact member $b^2$, terminals 3 and 4, contact member $B^2$, bridging member $E^2$, contact $C^2$, conductor Q, contact $A^1$, bridging member $D^1$, contact member $B^1$, terminals 2 and 1, contact member $b^1$, bridging member $d^1$, contact $a^1$, and thence to the positive terminal S.

Figure 2:
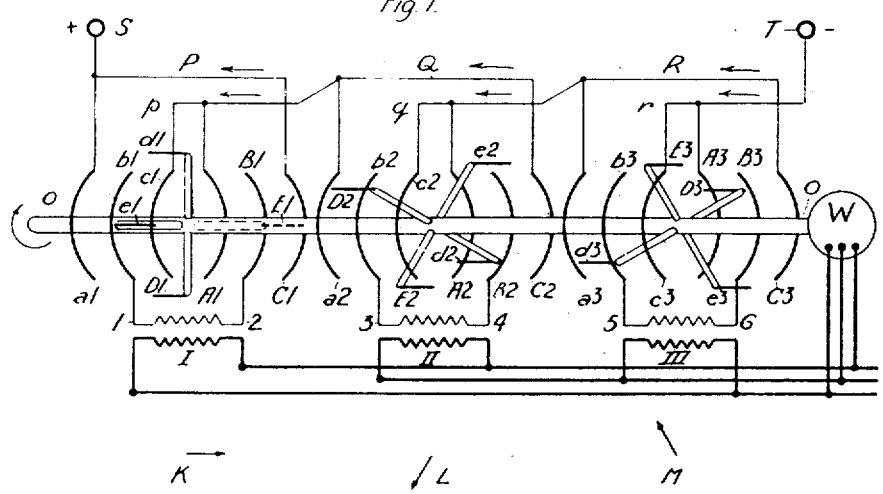
Fig. 2 is a similar view of the same apparatus shown angularly displaced 180° (as regards the polyphase current) from the position of Fig. 1.

According to Fig. 2 which shows the position of the apparatus 180° later in the cycle, it will be noted that the direction of current in each of the windings has reversed. Circuit may then be traced from negative terminal T to contact $A^3$, bridging member $D^3$, contact member $B^3$, terminals 6 and 5, contact member $b^3$, bridging member $d^3$, contact $a^3$, contact $A^2$ in phase II; bridging member $d^2$, contact member $B^2$, terminals 4 and 3, contact member $b^2$, bridging member $D^2$, contact $a^2$, contact $c^1$ in phase I; bridging member $e^1$, contact member $b^1$, terminals 1 and 2, contact member $B^1$, bridging member $E^1$, contact $C^1$, and conductor P to the positive terminal S. Although the direction of current of the polyphase windings has changed in the position shown in Fig. 2, the direction of current in the circuit between terminals T and S taken as a whole has remained the same.

It will be noted that the connections between phases which are utilized in the making up of this circuit, are entirely made between fixed contact members, and accordingly can be readily made and easily insulated without interfering with the remaining parts of the apparatus. Thus the construction of the bridging members will be simple, and the apparatus as a whole of such character that failure of insulation is not liable to be encountered. Furthermore, the structure of the contacts, contact members, bridging members, as well as the spacing between points at which arcing might occur, cuts down the tendency toward losses in changing circuit connections, which would make the rectified current irregular.

The terms "contacts" and "contact members" should be understood as including apparatus in which the bridging members do not physically engage the stationary elements $a^1$, $b^1$, $c^1$, and $A^1$, $B^1$, $C^1$. etc., since the invention is adapted for operation as a rectifier of the spark gap type, as well as to be embodied in structures where the bridging members act as wiping contacts.

While a specific embodiment of the invention has been described, it is obvious that many changes may be made without departing from the spirit of the invention, as specified in the following claims:

I claim:

1. A high tension rectifying apparatus comprising polyphase windings each having a plurality of terminals, fixed contact members each adapted to be connected to one of said terminals, a set of fixed contacts of positive and negative sign associated with each of said fixed contact members, the contacts of positive sign in one phase being connected to the contacts of negative sign in an adjacent phase, and means comprising movable bridging members associated with the contacts and contact members of the several phases, for maintaining the windings of all phases in series circuit connection and reversing the connection in circuit of each winding whenever the direction of current changes therein.

2. An apparatus for producing unidirectional current from the windings in the several phases of a polyphase circuit, comprising polyphase windings each having a plurality of terminals, fixed contact members each connected to one of the terminals of each of said windings, sets of fixed contacts of positive and negative sign associated with said contact members, bridging members adapted to connect said contact members selectively with the positive and negative contacts of said sets of contacts, and means for actuating said bridging members to change the connection of each of said contact members whenever the direction of current changes in the corresponding winding, said sets of contacts being interconnected to place all of said windings in series.

3. An apparatus for producing unidirectional current from the windings in the several phases of a polyphase circuit, comprising polyphase windings each having a plurality of terminals, fixed contact members each connected to one of the terminals of each of said windings, sets of fixed contacts of positive and negative sign associated with said contact members, bridging members adapted to connect said contact members selectively with the positive and negative contacts of said sets of contacts, and means for actuating said bridging members to change the connection of each of said contact members whenever the direction of current changes in the corresponding winding, said sets of contacts being interconnected to place all of said windings in series, means being provided whereby the points at which circuit is made and broken by said bridging members, are spaced apart a relatively large distance.

4. A high tension rectifying apparatus comprising polyphase windings, switching means for maintaining a series circuit connection between the windings of the several phases and reversing the connection of each winding whenever the direction of current therein changes, said switching means comprising fixed contact members respectively connected to the windings, and fixed contacts in each phase associated with said fixed contact members, but electrically insulated therefrom, electrical connections extending between fixed contacts in different phases, together with rotatable bridging members adapted to shift connection between said fixed contacts and contact members.

5. A high tension rectifying apparatus comprising polyphase windings each having a plurality of terminals, contact members each connected to one of said terminals, sets of contacts of positive and negative sign associated with each of said contact members and disposed on opposite sides thereof, sets of bridging members associated with each winding and operable selectively to bridge the space between the contact members and the contacts of positive and negative sign, the sets of bridging members being angularly displaced and operating to reverse the connection in circuit of the windings whenever the direction of current changes therein, said sets of contacts being interconnected to maintain all of said windings in series connection.

6. A rectifying apparatus for use with alternating current windings, comprising fixed contact members each adapted to be connected to terminals of the windings, fixed contacts of positive and negative sign disposed respectively on opposite sides of said contact members, and a plurality of rotatable bridging members adapted selectively to make circuit between the contact members and their respective contacts, said bridging members extending in opposite directions from said fixed contact members.

7. A rectifying apparatus for use with polyphase windings comprising fixed contact members each adapted to be connected to terminals of the windings, fixed unidirectional current contacts of positive and negative sign disposed respectively on opposite sides of said contact members, a plurality of rotatable bridging members adapted selectively to make circuit between the contact members and their respective contacts, said bridging members extending in opposite directions from said fixed contact members, and stationary conductors interconnecting the contacts of the several phases to place all the phases in series.

8. A high tension rectifying apparatus for use in connection with polyphase windings, comprising fixed members adapted to be connected respectively to the opposite terminals of the several phase windings, fixed members disposed on alternate sides of said first mentioned fixed members, some of which are interconnected in pairs with each other and some in pairs with the terminals of a direct current circuit and means comprising movable bridging members adapted to connect said first mentioned fixed members with one or the other of said alternately arranged fixed members, in accordance with direction of current flow in said first mentioned members, whereby current derived from several polyphase windings is rectified in series and maintained at constant polarity on said direct current circuit terminals.

NICHOLAS V. FEDOTOFF.